United States Patent
Thomas et al.

(10) Patent No.: US 6,733,035 B2
(45) Date of Patent: May 11, 2004

(54) SIDE CURTAIN AIR BAG ASSEMBLY

(75) Inventors: David James Thomas, Villa Hills, KY (US); Tim A. Fosberg, New Carlisle, OH (US); Leland Sinks, Farmersville, OH (US); Rebecca A Bevak, Mason, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/238,556

(22) Filed: Sep. 10, 2002

(65) Prior Publication Data

US 2003/0168835 A1 Sep. 11, 2003

Related U.S. Application Data

(60) Provisional application No. 60/361,786, filed on Mar. 5, 2002.

(51) Int. Cl.$^7$ .......................... B60R 21/22; B60R 21/16
(52) U.S. Cl. ................. 280/730.2; 280/743.2
(58) Field of Search ..................... 280/730.2, 743.2, 280/749

(56) References Cited

U.S. PATENT DOCUMENTS

| | | | |
|---|---|---|---|
| 3,774,936 A | 11/1973 | Barnett et al. ............. 280/150 |
| 5,462,308 A | 10/1995 | Seki et al. ................. 280/749 |
| 5,588,672 A | * 12/1996 | Karlow et al. ........... 280/730.2 |
| 5,707,075 A | * 1/1998 | Kraft et al. .............. 280/730.2 |
| 5,865,462 A | 2/1999 | Robins et al. ........... 280/730.2 |
| 5,924,722 A | * 7/1999 | Koide et al. ............. 280/730.2 |
| 5,924,723 A | 7/1999 | Brantman et al. ....... 280/730.2 |
| 5,975,566 A | 11/1999 | Bocker et al. ........... 280/730.2 |
| 6,010,149 A | 1/2000 | Riedel et al. ............ 280/730.2 |
| 6,095,551 A | 8/2000 | O'Docherty ............. 280/730.2 |
| 6,135,490 A | 10/2000 | Spary ...................... 280/730.2 |
| 6,135,493 A | 10/2000 | Jost et al. ................ 280/730.2 |
| 6,135,497 A | * 10/2000 | Sutherland et al. ......... 280/749 |
| 6,152,481 A | 11/2000 | Webber et al. .......... 280/730.2 |
| 6,155,597 A | 12/2000 | Bowers et al. .......... 280/730.2 |
| 6,168,191 B1 | 1/2001 | Webber et al. .......... 280/730.2 |
| 6,168,193 B1 | 1/2001 | Shirk et al. ............. 280/730.2 |
| 6,168,194 B1 | * 1/2001 | Cuevas et al. .......... 280/730.2 |
| 6,173,989 B1 | 1/2001 | Stutz ....................... 280/730.2 |
| 6,176,513 B1 | 1/2001 | Neidert ....................... 280/729 |
| 6,176,515 B1 | 1/2001 | Wallner et al. .......... 280/730.2 |
| 6,203,058 B1 | 3/2001 | Elqadah et al. .......... 280/730.2 |

(List continued on next page.)

FOREIGN PATENT DOCUMENTS

| | | |
|---|---|---|
| DE | 20016335 | 1/2001 |
| JP | 09249089 | 9/1997 |

OTHER PUBLICATIONS

Copy of EP Search Report Dated Jul. 2, 2003.

*Primary Examiner*—Ruth Ilan
(74) *Attorney, Agent, or Firm*—Scott A. McBain

(57) ABSTRACT

A side curtain air bag assembly for use in protection of an occupant within a vehicle which has a roof and a side structure below the roof. The assembly includes an inflatable air bag curtain adapted for inflation away from the vehicle roof in covering relation to at least a portion of the side structure between the side structure and an occupant. The assembly further includes a directional guide assembly including a dynamic guide element operatively connected to the inflatable air bag curtain such that upon inflation of the inflatable air bag curtain away from the vehicle roof, the dynamic guide element is carried in a direction extending away from the vehicle roof. Upon application of a tensioning force between the inflatable air bag curtain and the dynamic guide element having a vertical force component projecting towards the vehicle roof and a horizontal force component projecting into the inflatable air bag curtain the dynamic guide element is substantially locked into place at a position below the roof.

22 Claims, 7 Drawing Sheets

U.S. PATENT DOCUMENTS

| | | | |
|---|---|---|---|
| 6,224,091 B1 | 5/2001 | Eyrainer et al. | 280/730.2 |
| 6,237,938 B1 | 5/2001 | Boxey | |
| 6,237,943 B1 | 5/2001 | Brown et al. | |
| 6,241,277 B1 | 6/2001 | Heigl et al. | 280/730.2 |
| 6,273,456 B1 | 8/2001 | Heigl | 280/730.2 |
| 6,273,458 B1 | 8/2001 | Steffens, Jr. et al. | 280/730.2 |
| 6,276,712 B1 | 8/2001 | Welch et al. | 280/730.2 |
| 6,308,982 B1 * | 10/2001 | Wallner et al. | 280/730.2 |
| 6,318,753 B1 | 11/2001 | Valkenburg | 280/730.2 |
| 6,347,807 B1 | 2/2002 | Schink et al. | 280/730.2 |
| 6,431,588 B1 * | 8/2002 | Bayley et al. | 280/730.2 |
| 6,435,545 B1 * | 8/2002 | Osentoski et al. | 280/730.2 |
| 6,454,297 B2 * | 9/2002 | Fischer | 280/730.2 |
| 6,471,240 B2 * | 10/2002 | Bakhsh et al. | 280/729 |
| 6,474,678 B1 * | 11/2002 | Boxey | 280/728.2 |
| 6,474,681 B2 * | 11/2002 | Peer et al. | 280/730.2 |
| 2002/0070537 A1 * | 6/2002 | Webber et al. | 280/730.2 |
| 2002/0175502 A1 * | 11/2002 | Tesch et al. | 280/730.2 |
| 2003/0127842 A1 * | 7/2003 | Pywell | 280/753 |

* cited by examiner

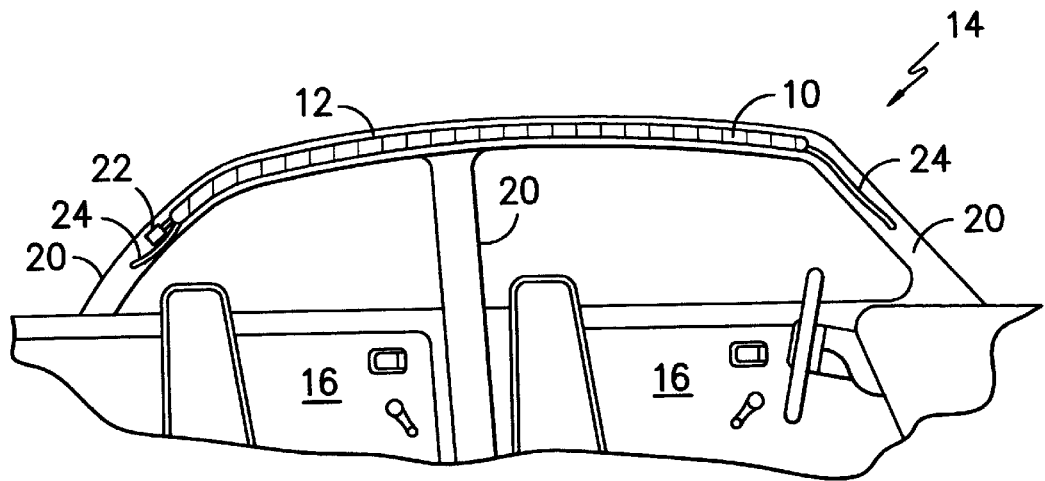
FIG. −1A−
PRIOR ART
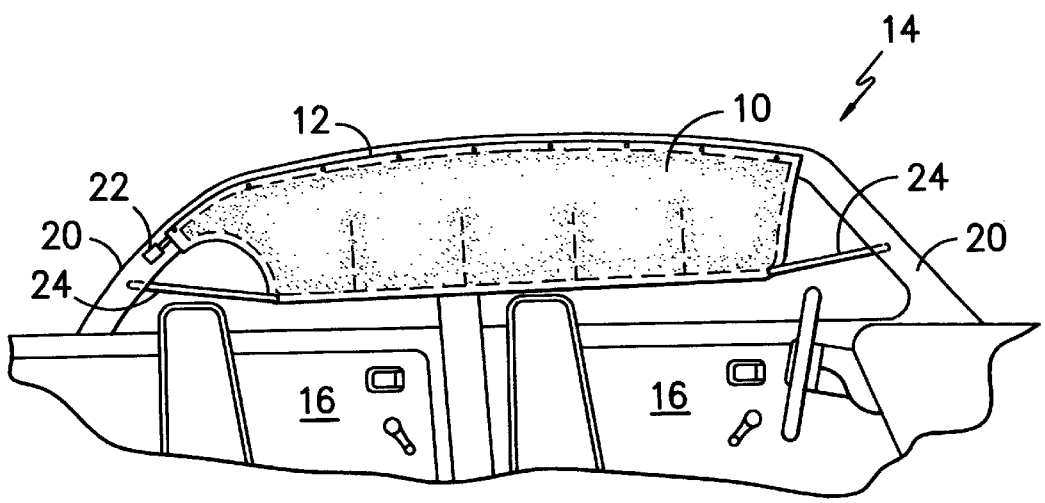
FIG. −1B−
PRIOR ART

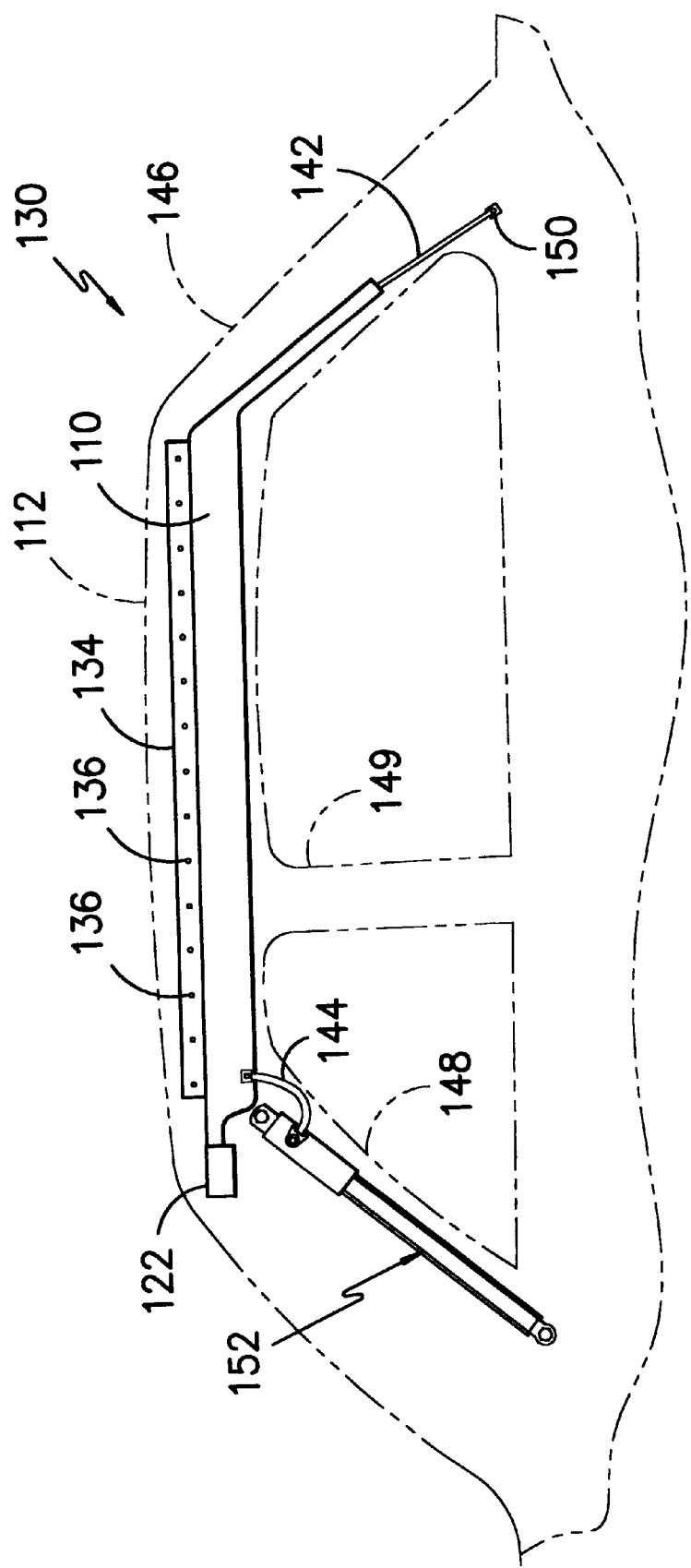
FIG. -2-

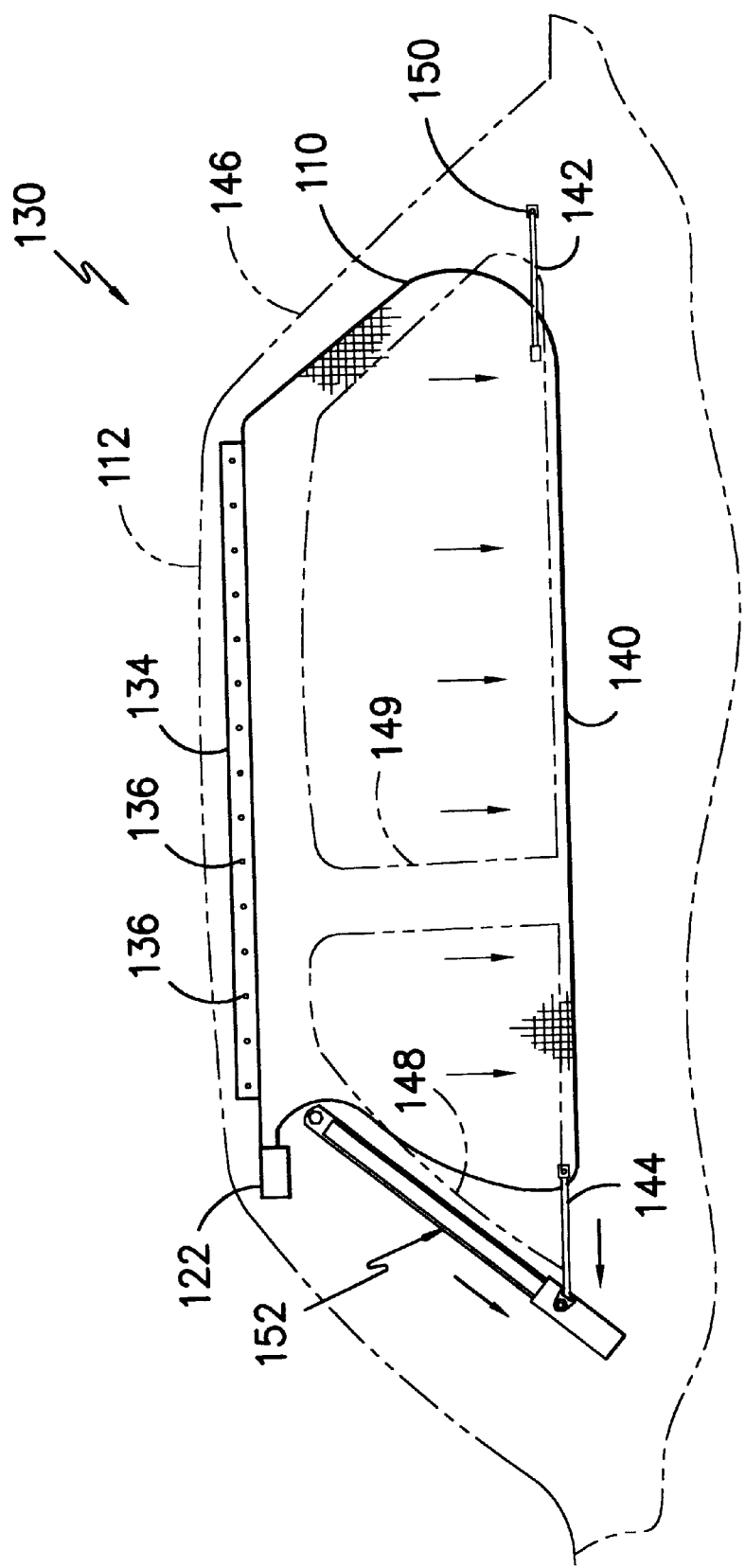
FIG. -3-

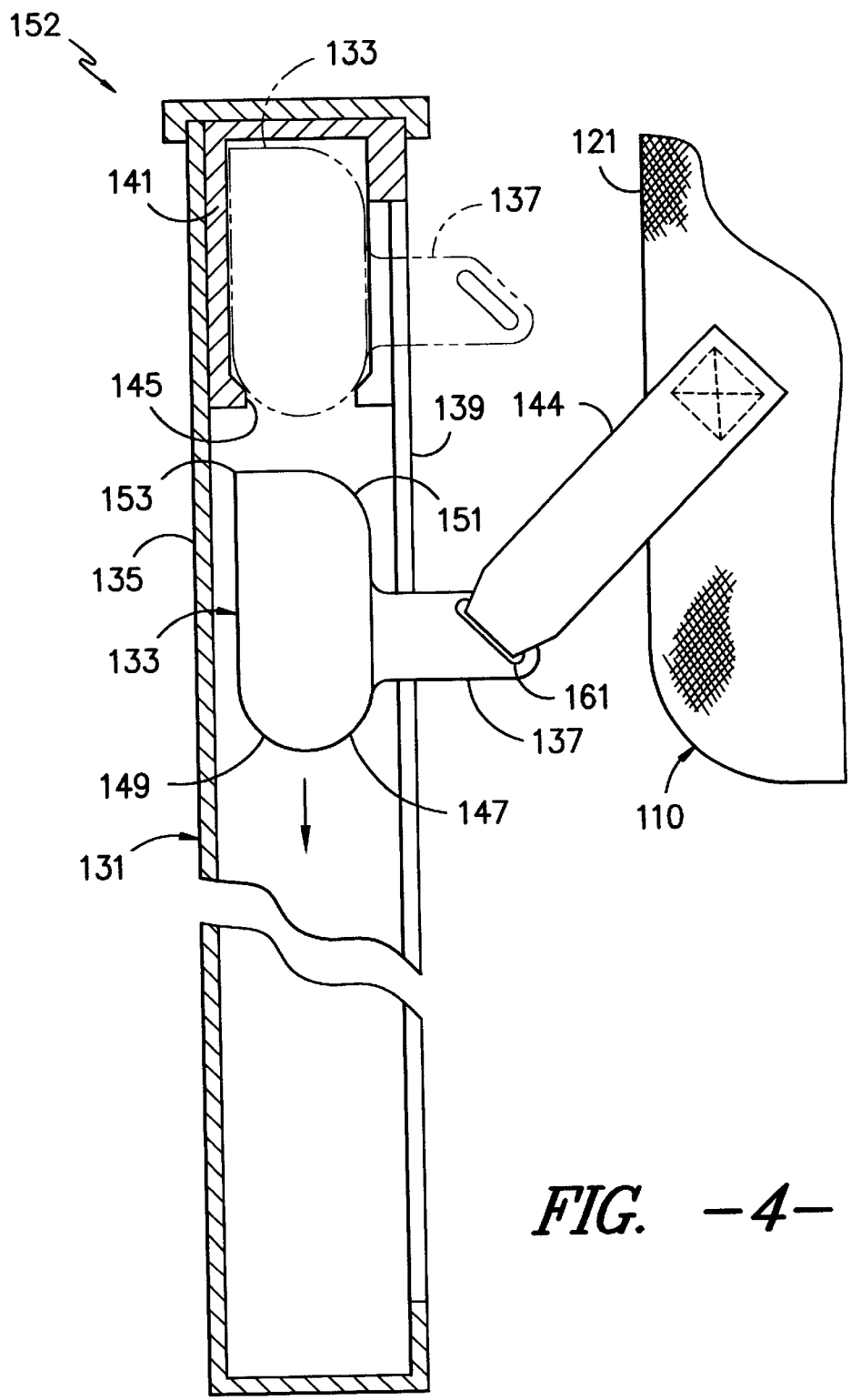
FIG. -4-

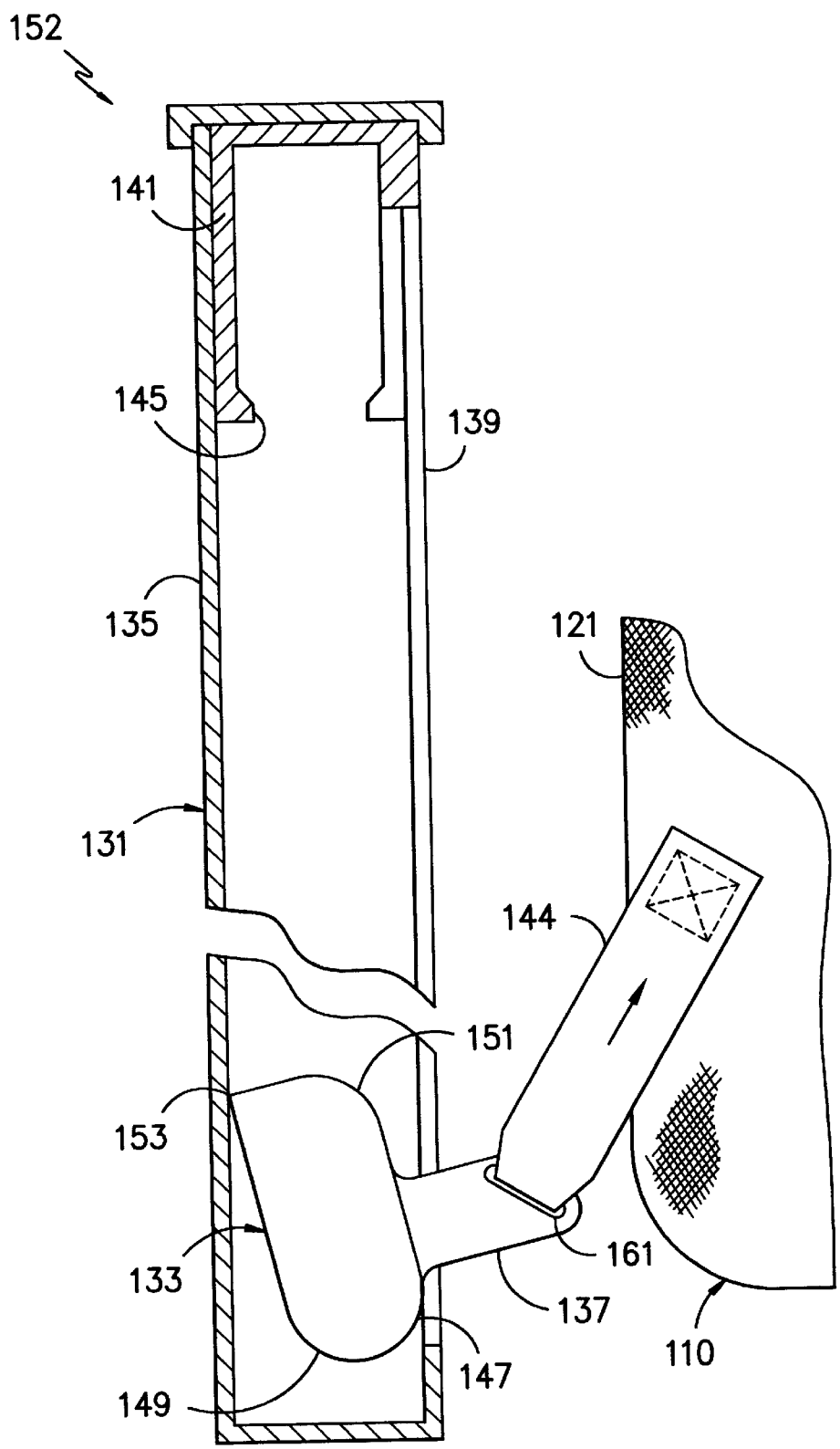
FIG. -5-

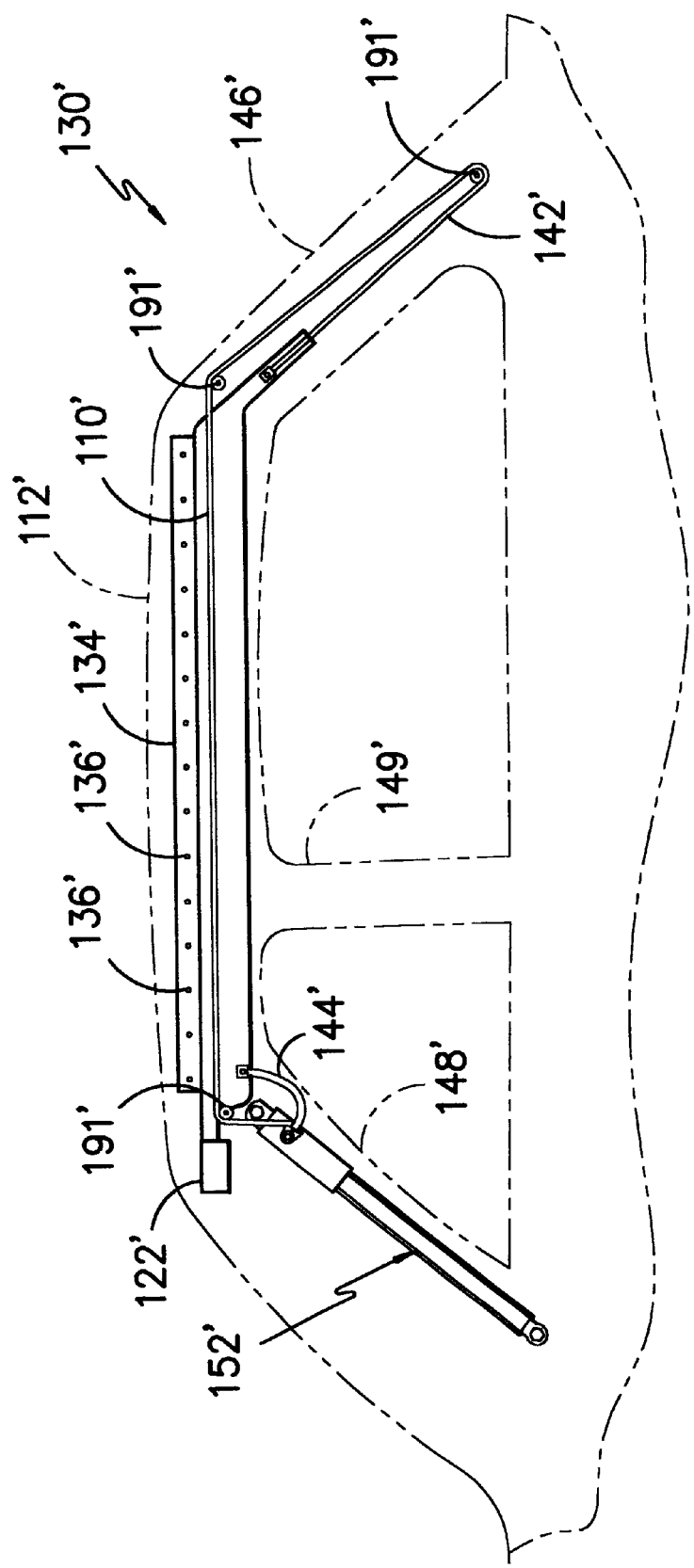
FIG. -6-

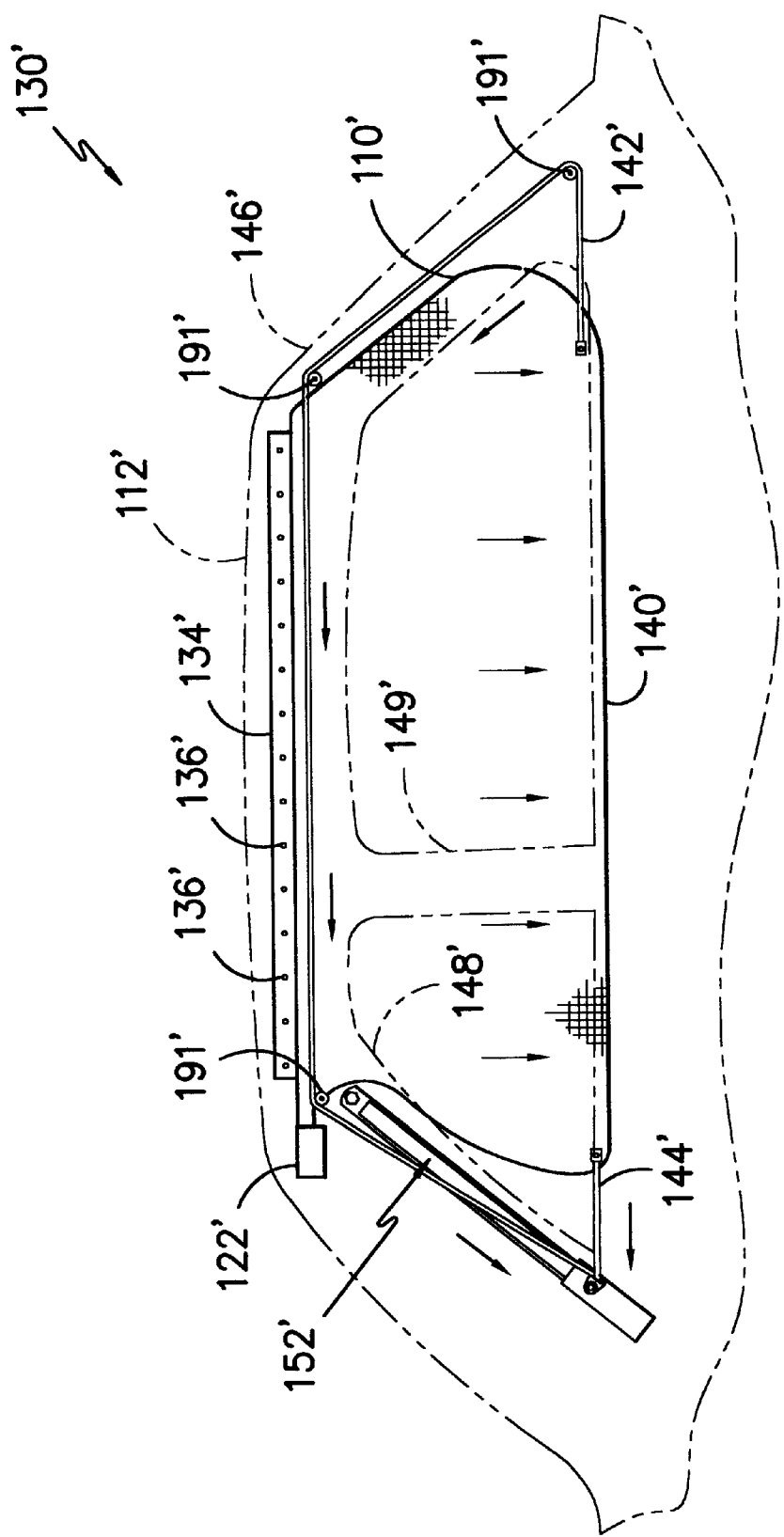
FIG. -7-

SIDE CURTAIN AIR BAG ASSEMBLY

CROSS-REFERENCE TO RELATED APPLICATION

This application claims priority benefit from provisional application No. 60/361,786 filed Mar. 5, 2002 the contents of which are incorporated herein in their entirety.

TECHNICAL FIELD

The present invention relates to an assembly for guiding an inflatable curtain-type airbag cushion across a side portion of a vehicle during a collision event and thereafter holding the airbag cushion in a tensioned condition subsequent to the deployment.

BACKGROUND OF THE INVENTION

It is well known in motor vehicles to provide air bag cushions for protecting a vehicle occupant during a collision event wherein such air bag cushions are in fluid communication with gas generating inflators so as to inflate the cushions upon sensing predetermined vehicle conditions such as deceleration exceeding a certain level. It is further known to provide air bag systems including inflatable restraint cushions which are deployed from positions of attachment along the roof rail portion of the vehicle frame above the doors of the vehicle such that the inflatable cushion extends downwardly in substantially curtain-like fashion between the occupant to be protected and the side portions of the vehicle adjacent to such occupants. Such coverage provides a cushioning restraint to the occupant during a side impact or extended roll-over collision event thereby aiding in the protection of the occupant during such events.

It is generally desirable for a curtain-like side air bag cushion to be held in a substantially tensioned condition across the surface being covered so as to provide a well defined extended barrier between the occupant and the side portion of the vehicle. Such a condition may be useful in holding the vehicle occupant within the protective frame of the vehicle during an extended roll-over event.

A typical prior tethering arrangement for maintaining tension across the lower edge of a curtain-like cushion is illustrated in FIGS. 1A and 1B. As illustrated, in such prior embodiments an inflatable curtain 10 is stored in packed relation generally along the roof rail 12 of a vehicle 14 generally above the doors 16. The length of the inflatable curtain 10 is such that upon inflation coverage is provided over at least a portion of the distance extending along the side of the vehicle interior between two or more structural pillars 20 extending away from the roof rail 12.

In the illustrated embodiment, the inflatable curtain 10 is shown to be attached at the forward "A" pillar and at the rearward "C" pillar so as to cover the intermediate "B" pillar. As shown, in prior constructions the inflatable curtain 10 is inflated by a gas generating inflator 22 thereby causing the lower edge of the inflatable curtain 10 to move downwardly away from the roof rail 12. As the inflatable curtain 10 undergoes inflation, it tends to shorten as cushioning depth is developed (FIG. 1B). This shortening may be restricted by the presence of tethering straps 24 of fixed length extending between the lower edge of the inflatable curtain 10 and the forward and rearward pillars 20 bordering the area to be covered.

Utilizing the prior design of fixed length tethers 24 is useful in providing tension across the lower edge once the designed inflation of the inflatable curtain 10 is complete provided that the length of the tethers is well matched to the particular coverage characteristics of the inflatable curtain 10 relative to the pillars 20. In particular, once the curtain 10 is in the fully inflated condition if the tethers are of the proper length, a balanced tension is established and may thereafter be maintained between the shortened inflatable curtain 10 and the fully extended tethering straps 24. Thus prior curtain constructions which utilize a combination of inflation induced shortening and fixed length tethering straps 24 are typically dependent upon the cushion shape being substantially fully established before the final tension is generated. Accordingly, the tethers in such systems are generally slack during the preliminary stages of deployment prior to the bottom edge becoming positioned and fully tensioned. After deployment has taken place, the tensioning may be at least partially lost if the airbag cushion becomes deflated.

SUMMARY OF THE INVENTION

This invention provides advantages and alternatives over the prior art by providing a system which assists in guiding an inflatable curtain-style air bag cushion into position and which thereafter holds the airbag cushion in place to provide tensioning support to the cushion.

In the invention, a dynamic tethering element is utilized which travels in conjunction with the downward deployment of the inflatable curtain structure so as to both tension the curtain structure while at the same time providing a guiding action so as to bring the curtain structure into the proper position at which it is thereafter maintained. The dynamic tethering element is blocked against retreating movement after deployment has taken place. The dynamic tethering element avoids substantial reliance upon curtain shortening to provide a tensioning force across the inflatable curtain structure. In addition, the dynamic tethering element may be useful in pulling the inflating curtain into a desired position at an early stage of deployment. Accordingly, a number of useful advantages are provided.

BRIEF DESCRIPTION OF THE DRAWINGS

The accompanying drawings which are incorporated in and which constitute a part of this specification illustrate several exemplary embodiments of the present invention and, together with a general description of the invention given above and the detail description set forth below, serve to explain the principles of the invention wherein:

FIGS. 1A and 1B are cut-away side views of a vehicle incorporating a prior-art tethering system;

FIG. 2 is a schematic view of an airbag system incorporating a dynamic tethering arrangement for moving a tethering strap in conjunction with the deployment of an inflatable curtain prior to deployment of the airbag cushion;

FIG. 3 is a view similar to FIG. 2, after deployment of the airbag cushion;

FIG. 4 illustrates an exemplary tether guide assembly in attached relation to an inflatable curtain;

FIG. 5 is a view similar to FIG. 4 illustrating a tensioned, locked orientation;

FIG. 6 is a view similar to FIG. 3, illustrating an exemplary arrangement for tensioning tethers operatively connected to opposing ends of the airbag cushion prior to inflation; and FIG. 7 is a view corresponding to FIG. 6, wherein the airbag cushion is in a tensioned, deployed condition.

While the invention has been illustrated and generally described above and will hereinafter be described in connection with certain potentially preferred embodiments and procedures, it is to be understood and appreciated that in no event is the invention to be limited to such illustrated and described embodiments and procedures. On the contrary, it is intended that the present invention shall extend to all alternatives and modifications as may embrace the broad principles of this invention within the true spirit and scope thereof.

DESCRIPTION OF THE PREFERRED EMBODIMENT

In FIGS. 2 and 3, a first illustrative embodiment of a side air bag assembly 130 is illustrated. As shown, in this embodiment a gas generating inflator 122 is disposed in fluid communication with an inflatable curtain 110 which is normally disposed in folded condition above the doors of a vehicle in attached relation to a roof rail 112 or other structural member. By way of example only, the inflatable curtain may be held in place at its upper edge 134 by an upper attachment border incorporating a plurality of fastener accepting openings 136 along its length. Screws, snap fit fasteners or the like may extend through the fastener accepting openings 136 for engagement with the underlying structural member in a manner as will be well known to those of skill in the art. Thus, the inflatable curtain is secured in place along the upper edge 134 while a lower edge 140 is deployable away from the upper edge 134 (FIG. 3). If desired, it is contemplated that the inflatable curtain 110 may include noninflating regions at pre-established locations across the inflatable curtain 110. Of course, the presence of such non-inflating regions is fully discretionary.

Upon the receipt of an activating signal, the inflator 122 emits a pressurized volume of inflation gas into the inflatable curtain 110 thereby causing expansion of the inflatable curtain 110 and causing the inflatable curtain to expand downwardly away from its storage location so as to provide a covering barrier across a side portion of the vehicle. In the illustrated embodiment, the inflatable curtain is attached to a first tethering element 142 and to a second tethering element 144. The first and second tethering elements 142, 144 are preferably of an elongate pliable construction such as a strap, cord, or the like and may be formed from any suitable material providing adequate tensile strength to support tension across the inflatable curtain 110. By way of example only, and not limitation, one contemplated construction for the tethering elements are straps of woven textile material such as woven nylon or the like.

In the illustrated embodiment the first tethering element 142 is secured between the inflatable curtain 110 and a static attachment location 150 such as along a forward structural pillar 146. As the inflatable curtain 110 expands, it undergoes a natural shortening thereby pulling away from the static attachment location and creating tension within the first tethering element 142.

In the illustrated embodiment the second tethering element 144 is secured between the inflatable curtain 110 and a directional dynamic guide assembly 152 extending generally adjacent to the deployment path of the inflatable curtain 110 such as along a rear structural pillar 148. As the inflatable curtain 110 expands downwardly, the second tethering element 144 is carried along the directional dynamic guide assembly 152 thereby promoting the controlled downward movement of the inflatable curtain 110. Following deployment, the directional dynamic guide assembly restrains the second tethering element against upward movement thereby promoting the maintenance of the inflatable curtain in its deployed orientation.

It is to be understood that the illustrated positions of the static attachment location 150 and the directional dynamic guide assembly 152 are exemplary only and are subject to a wide array of variations. By way of example only, it is contemplated that the relative positions of the static attachment location 150 and the directional dynamic guide assembly 152 may be reversed if desired such that the directional dynamic guide assembly 152 is located at a forward location such as along the forward structural pillar 146. Likewise, in the event that the inflatable curtain 110 is to cover only an area between the forward structural pillar 146 and an intermediate structural pillar 149, such as in a vehicle having only one row of seats, it is contemplated that either the static attachment location 150 or the dynamic guide assembly 152 may be located along the forward structural pillar 146 with the other of the static attachment location 150 or the dynamic guide assembly 152 located along the intermediate structural pillar 149.

One exemplary construction of the directional dynamic guide assembly 152 is illustrated in FIGS. 4 and 5. As shown, in this exemplary construction the dynamic guide assembly includes a sliding guide block 133 carried within a tubular guide channel 131. According to the illustrated embodiment, the guide block 133 includes a protruding buckle 137 extending outwardly through a slot 139 extending along the tubular guide channel 131. By way of example only, it is contemplated that the tubular guide channel 131 may be mounted along the "B" or "C" pillar of the vehicle such that the slot 139 is disposed in substantially opposing relation to a rearwardly facing lateral edge 121 of an inflatable curtain structure 110

According to the illustrated embodiment, a dynamic tethering element 144 such as a strap, cord or the like extends in operative connecting relation between the curtain structure 110 and the buckle 137 such as through an angled tether acceptance slot 161. The dynamic tethering element may be connected at any location along the curtain structure 110 although attachment generally near a lower corner may be preferred. While the use of a tethering element 144 such as a strap member of textile fabric or other substantially pliable material such as a cord or the like may be desirable in many arrangements, it is likewise contemplated that other materials such as plastic, metal or the like may also be utilized. Likewise, it is also contemplated that the tethering element 144 may be eliminated entirely if desired with a direct connection being made between the curtain structure 110 and the buckle 137 such as by a clamping or adhesive arrangement.

Regardless of the form of operative connection between the curtain structure and the guide block 133, it is contemplated that the guide block 133 is normally held in fixed relation within a capping chamber 141 (as shown in phantom lines). The capping chamber 141 holds the guide block 133 in substantially secure relation prior to deployment so as to reduce noise but provides relatively little resistance to egress of the guide block 133 through a deformable mouth opening 145 as a downward displacement force is applied by the inflating curtain structure 110.

As will be appreciated, during deployment the curtain structure 110 is forced downward and generally slightly away from the tubular guide channel 131 as inflation takes place. This movement is translated to the guide block 133 causing the guide block 133 to pass out of the capping chamber 141. As shown, the guide block 133 may have curved lower lateral edges 147, 149 to facilitate sliding displacement out of the capping chamber 141. The guide block 133 may also have a curved upper lateral edge 151 projecting generally towards the curtain structure 110.

As illustrated, once the guide block 133 is below the capping chamber 141 there is some space between the guide block 133 and the sides of the tubular guide channel 131. This space allows the guide block 133 to cock within the tubular guide channel 131 as a moment force is applied. If the resultant vector of applied forces is downward and towards the curtain structure 110, or downward and away from the curtain structure 110 or upward and away from the curtain structure 110, the curved surfaces 147, 149, 151 on the lower front, lower rear and upper front of the guide block 133 allow the guide block 133 to slide relative to the tubular guide channel even though the guide block 133 is cocked. However, as best illustrated in FIG. 5, if there is an upward force with a resultant vector projecting towards the curtain structure an angular edge 153 such as a ninety degree edge on the upper rear of the guide block 133 will dig into a wall 135 thereby causing the guide block 133 to be locked into a cocked position.

As will be appreciated an upward forward force vector projecting towards the curtain structure 110 giving rise to the locked relationship illustrated in FIG. 5 may arise due to shrinkage once the curtain structure 110 is deployed and/or due to an occupant interacting with the curtain structure 110. In such situations a locking relation may be desirable to hold the curtain structure 110 in place. The locked cocking relation may be further enhanced by angled relation of the tether accepting slot 161 within the buckle 137 so as to translate an upward tensioning force into the locking cocked orientation.

It is to be understood that regardless of the configuration of the directional dynamic guide assembly which is utilized, the present invention may incorporate a wide array of tethering arrangements to effect desired tensioning characteristics. By way of example only and not limitation, one contemplated tethering arrangement as may be utilized to apply tension to both ends of an inflatable curtain structure is illustrated in FIGS. 6 and 7 in which elements corresponding to those previously described in relation to FIGS. 2 and 3 are designated by corresponding reference numerals with a prime. This arrangement operates in substantially the same manner as that previously described with respect to FIGS. 2 and 3 above with the exception that the first tethering element 142' extends away from the curtain structure 110' and around an arrangement of guide elements 191' to the directional dynamic guide assembly 152' which may be of any suitable construction including a lockable guide block as described in relation to FIGS. 4 and 5 such that the downward movement of the directional dynamic guide assembly applies tension through the first tethering element 142'.

As illustrated, it is contemplated that the directional guide assembly 152, 152' may be mounted in angled relation to the inflatable curtain structure 110, 110' such that the lower portion of the directional dynamic guide assembly is located further away from the inflatable curtain than the upper portion. In such an arrangement tension may be substantially increased as inflatable curtain structure is deployed downwardly. Of course, it is likewise contemplated that the directional guide assembly may be mounted in substantially parallel relation to the travel path of the inflatable curtain structure or in any other orientation as may be desired.

It is to be understood that while the present invention has been illustrated and described in relation to certain potentially preferred embodiments, constructions and procedures the presentation of such embodiments, constructions and procedures is intended to be illustrative only and the present invention is in no event to be limited thereto. Accordingly, it is to be understood that the present invention is intended to extend to all modifications and variations as may incorporate the broad aspects of the invention which fall within the full spirit and scope of the appended claims and all equivalents thereto.

What is claimed is:

1. A side curtain air bag assembly for use in protection of an occupant within a vehicle which has a roof and a side structure below the roof, the assembly comprising:

an inflatable air bag curtain adapted for inflation away from the vehicle roof in covering relation to at least a portion of the side structure between the side structure and the occupant upon introduction of inflation gas;

an inflator in fluid communication with the inflatable air bag curtain for providing inflation gas to the inflatable air bag curtain; and a directional guide assembly including an elongate bounded guide channel and a dynamic guide element disposed within the bounded guide channel wherein the dynamic guide element is operatively connected to the inflatable air bag curtain such that upon inflation of the inflatable air bag curtain away from the vehicle roof, the dynamic guide element is carried in a direction extending away from the vehicle roof at least partially along the bounded guide channel and wherein the dynamic guide element is adapted to be substantially freely slideable within the bounded guide channel during inflation of the inflatable air bag curtain except upon application of a tensioning force having a vertical force component projecting towards the vehicle roof and a horizontal force component projecting into the inflatable air bag curtain and wherein upon application of the tensioning force having a vertical force component projecting towards the vehicle roof and a horizontal force component projecting into the inflatable air bag curtain the dynamic guide element is locked into place at a position along the bounded guide channel such that retraction of the inflatable air bag curtain is prevented, wherein the dynamic guide element comprises a sliding block disposed within the guide channel, wherein the sliding block includes a first lateral face normally projecting towards the inflatable air bag cushion and a second lateral face normally projecting away from the inflatable air bag cushion and wherein the first lateral face is disposed between an upper rounded edge and a lower rounded edge and wherein the second lateral face extends between a substantially sharp angled upper edge and a lower rounded edge.

2. The assembly as recited in claim 1, wherein the bounded guide channel comprises an elongate enclosure and wherein the sliding block is operatively connected to a buckle assembly projecting through a slot extending at least partially along the length of the bounded guide channel.

3. The assembly as recited in claim 1, wherein the directional guide assembly is disposed along a "C" pillar of the vehicle.

4. The assembly as recited in claim 3, wherein the elongate bounded guide channel is disposed at a substantially non-perpendicular angle to the vehicle roof.

5. The assembly as recited in claim 1, wherein an elongate tether element extends between the dynamic guide element and the inflatable air bag curtain.

6. The assembly as recited in claim 5, wherein the elongate tether element is held within a buckle structure operatively connected to the dynamic guide element.

7. The assembly as recited in claim 6, wherein the buckle structure includes an angled slot opening for acceptance of the elongate tether element wherein the slot opening includes a first end and a second end and wherein the first end is normally disposed at a higher elevation and is closer to the bounded guide channel than the second end.

8. A side curtain air bag assembly for use in protection of an occupant within a vehicle which has a roof and a side structure below the roof, the assembly comprising:

an inflatable air bag curtain adapted for inflation away from the vehicle roof in covering relation to at least a portion of the side structure between the side structure and the occupant upon introduction of inflation gas;

an inflator in fluid communication with the inflatable air bag curtain for providing inflation gas to the inflatable air bag curtain; and a directional guide assembly including an elongate bounded guide channel and a dynamic guide element disposed within the bounded guide channel wherein the dynamic guide element is operatively connected to the inflatable air bag curtain such that upon inflation of the inflatable air bag curtain away from the vehicle roof, the dynamic guide element is carried in a direction extending away from the vehicle roof at least partially along the bounded guide channel and wherein the dynamic guide element is adapted to be substantially freely slideable within the bounded guide channel during inflation of the inflatable air bag curtain except upon application of a tensioning force having a vertical force component projecting towards the vehicle roof and a horizontal force component projecting into the inflatable air bag curtain and wherein upon application of the tensioning force having a vertical force component projecting towards the vehicle roof and a horizontal force component projecting into the inflatable air bag curtain the dynamic guide element is locked into place at a position along the bounded guide channel such that retraction of the inflatable air bag curtain is prevented, wherein the dynamic guide element comprises a sliding block disposed within the guide channel and wherein the guide channel includes an upper capping chamber for housing the sliding block at a substantially fixed position prior to inflation of the inflatable air bag curtain and wherein the sliding block is adapted to be carried out of the capping chamber upon inflation of the inflatable air bag curtain.

9. The assembly as recited in claim 8, wherein the sliding block includes a substantially curved terminal end projecting in the direction of travel away from the vehicle roof.

10. The assembly as recited in claim 8, wherein the sliding block includes a first lateral face normally projecting towards the inflatable air bag cushion and a second lateral face normally projecting away from the inflatable air bag cushion and wherein the first lateral face is disposed between an upper rounded edge and a lower rounded edge and wherein the second lateral face extends between a substantially sharp angled upper edge and a lower rounded edge such that after the sliding block is carried out of the capping chamber, and upon application of a tensioning force having a vertical force component projecting towards the vehicle roof and a horizontal force component projecting into the inflatable air bag curtain, the sliding block is tilted within the bounded guide channel and said substantially sharp angled upper edge engages an interior portion of the guide channel, whereby the sliding block is substantially locked against upward movement.

11. The assembly as recited in claim 10, wherein the bounded guide channel comprises an elongate enclosure and wherein the sliding block is operatively connected to a buckle assembly projecting through a slot extending at least partially along the length of the bounded guide channel.

12. A side curtain air bag assembly for use in protection of an occupant within a vehicle which has a roof and a side structure below the roof, the assembly comprising:

an inflatable air bag curtain adapted for inflation away from the vehicle roof in covering relation to at least a portion of the side structure between the side structure and the occupant upon introduction of inflation gas, wherein the inflatable air bag curtain includes a first lateral edge and a second lateral edge opposing the first lateral edge;

an inflator in fluid communication with the inflatable air bag curtain for providing inflation gas to the inflatable air bag;

a directional guide assembly including a dynamic guide element operatively connected to the inflatable air bag curtain by a tethering element extending away from the inflatable air bag curtain such that the dynamic guide element is moved away from the vehicle roof along a travel path adjacent to the first lateral edge in conjunction with the inflatable air bag curtain as the inflatable air bag curtain is inflated and wherein the dynamic guide element is substantially restrained against movement towards the vehicle roof when the tethering element is subjected to a tensioning force having a vertical force component projecting towards the vehicle roof and a horizontal force component projecting into the inflatable air bag curtain; and at least one elongate tensioning element extending away from the second lateral edge of the inflatable air bag curtain and over the portion of the side structure covered by the inflatable air bag curtain, wherein said at least one elongate tensioning element is operatively connected to the dynamic guide element such that upon movement of the dynamic guide element away from the vehicle roof said at least one elongate tensioning element is placed into tension.

13. The assembly as recited in claim 12, wherein the directional guide assembly is disposed along a "C" pillar of the vehicle.

14. The assembly as recited in claim 13, wherein the travel path adjacent to the first lateral edge is arranged at a substantially non-perpendicular angle to the vehicle roof.

15. The assembly as recited in claim 12, wherein the tethering element extending away from the inflatable air bag curtain is held within a buckle structure operatively connected to the dynamic guide element.

16. The assembly as recited in claim 12, wherein the dynamic guide element comprises a sliding block disposed within an elongate guide channel.

17. The assembly as recited in claim 16, wherein the sliding block includes a substantially curved terminal end projecting in the direction of travel away from the vehicle roof.

18. The assembly as recited in claim 12, wherein the sliding block includes a first lateral face normally projecting towards the inflatable air bag cushion and a second lateral face normally projecting away from the inflatable air bag cushion and wherein the first lateral face is disposed between an upper rounded edge and a lower rounded edge and wherein the second lateral edge extends between a substantially sharp angled upper edge and a lower rounded edge.

19. The assembly as recited in claim 12, wherein the dynamic guide element comprises a sliding block disposed within a guide channel and wherein the guide channel includes an upper capping chamber for housing the sliding block at a substantially fixed position prior to inflation of the inflatable air bag curtain and wherein the sliding block is adapted to be carried out of the capping chamber upon inflation of the inflatable air bag curtain.

20. The assembly as recited in claim 19, wherein the sliding block includes a substantially curved terminal end projecting in the direction of travel away from the vehicle roof.

21. The assembly as recited in claim 19, wherein the sliding block includes a first lateral face normally projecting towards the inflatable air bag cushion and a second lateral face normally projecting away from the inflatable air bag cushion and wherein the first lateral face is disposed between an upper rounded edge and a lower rounded edge and wherein the second lateral face extends between a substantially sharp angled upper edge and a lower rounded edge such that after the sliding block is carried out of the capping chamber, and upon application of a tensioning force to the tether having a vertical force component projecting towards the vehicle roof and a horizontal force component projecting into the inflatable air bag curtain, the sliding block is tilted within the guide channel and said substantially sharp angled upper edge engages an interior portion of the guide channel, whereby the sliding block is substantially locked against upward movement.

22. The assembly as recited in claim 21, wherein the guide channel comprises an elongate enclosure and wherein the sliding block is operatively connected to a buckle assembly projecting through a slot extending at least partially along the length of the guide channel.

* * * * *